R. L. BRADLEY.
STRETCHER OR BED FOR AUTOMOBILES.
APPLICATION FILED FEB. 9, 1914.
1,134,312. Patented Apr. 6, 1915.
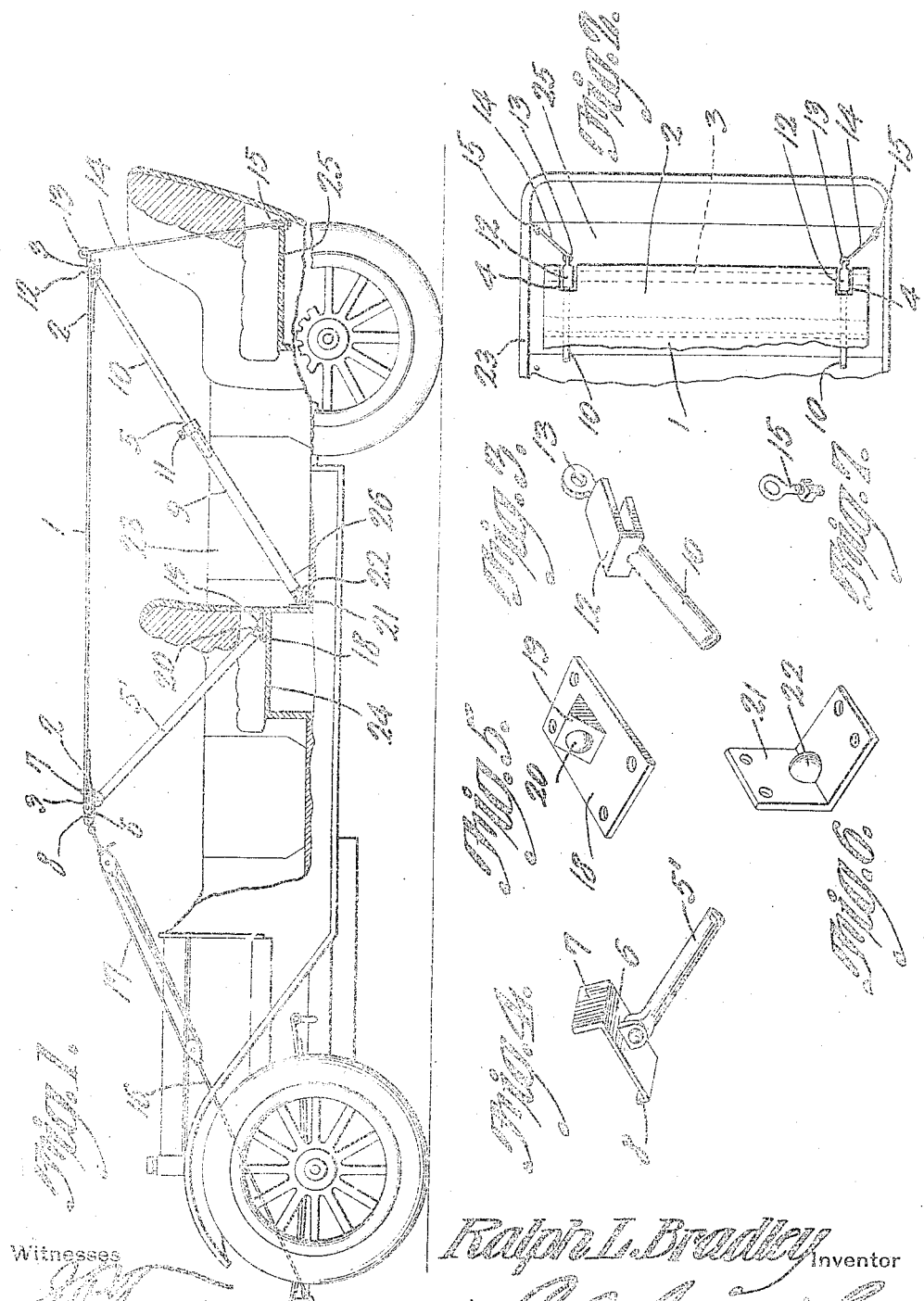

UNITED STATES PATENT OFFICE.

RALPH L. BRADLEY, OF BUTTE, MONTANA.

STRETCHER OR BED FOR AUTOMOBILES.

1,134,312.

Specification of Letters Patent.

Patented Apr. 6, 1915.

Application filed February 9, 1914. Serial No. 817,645.

*To all whom it may concern:*

Be it known that I, RALPH L. BRADLEY, a citizen of the United States, residing at Butte, in the county of Silverbow and State of Montana, have invented a new and useful Stretcher or Bed for Automobiles, of which the following is a specification.

The present invention appertains to a bed or stretcher attachment for automobiles, and is particularly an improvement over the appliance disclosed in my former patent issued December 23, 1913, No. 1,082,223.

It is the object of the present invention to provide an attachment of the nature indicated, embodying a novel and improved construction and assemblage of its component parts whereby the attachment may be applied to various automobiles or motor vehicles to convert the same into an ambulance or bed, when circumstances necessitate.

Another object of the invention is to provide an appliance of the character specified, which may be applied to the body of a motor vehicle or automobile in a convenient and efficient manner, and which may be compactly folded or collapsed when not in use so as to be stowed away.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention has been illustrated in its preferred embodiment in the accompanying drawing, wherein:—

Figure 1 is a side elevation of a motor vehicle, parts being broken away, illustrating the present attachment applied. Fig. 2 is a fragmental plan view of the rear end or tonneau of the vehicle body, illustrating the rear end portion of the attachment. Fig. 3 is a fragmental perspective of the upper end portion of one of the rear supporting members or legs. Fig. 4 is a fragmental perspective view of the upper end portion of one of the forward supporting members or legs. Figs. 5 and 6 are perspective views of the foot members of the front and rear legs, respectively. Fig. 7 is a perspective view of one of the anchors for the rear guys.

In carrying out the present invention, there is provided a rectangular apron or body 1, which is of suitable size, and which is constructed of canvas, or other textile or fabric material possessing the requisite properties.

The ends of the apron 1 are provided with hems 2 through which a pair of cross bars or rods 3 are passed. Each of the hems 2 are provided with openings 4 adjoining the side edges of the apron, and exposing the corresponding cross bar 3.

The rear end of the apron 1 is supported by a pair of rearwardly inclined supporting members or legs 5, while the forward end of the apron is supported by a pair of forwardly inclined supporting members or legs 5', the front and rear legs 5' and 5, respectively, being relatively short and long.

To the upper ends of the front legs or supporting members 5' are pivoted seat members 6 having the upturned ends 7 and 8, whereby the front cross bar 3 may be engaged upon the seats 6, for connecting the front legs to the forward end of the apron 1.

Each of the rear legs 5 is extensible, and comprises a lower tubular member 9, and an upper member or rod 10 telescoping into the tubular member or section 9, a set screw 11 being carried by the upper end of the tubular section 9 for clamping the upper section or rod 10 at any adjusted position.

The upper end of each of the rear legs, or the upper end of the rod or section 10 of each rear leg, is provided with an angular fork 12 adapted to straddle or engage the rear cross bar 3 within one of the openings 4, as suggested in Fig. 2. The upper arms of the forks 12 are provided with eyes 13 at their free ends, and cables or other flexible guys 14 are attached to the eyes 13, at one end, and to anchors or eye bolts 15 at their other ends.

Forward guys 16 are connected to the forward cross bar 3, and each of the guys 16 has interposed therein, a suitable block and tackle 17.

In order to properly support the front legs 5', feet members 18 are provided for the said legs, each of the feet or base members 18 having a V-shaped lug 19 thereon, and one face of the lug being provided with a rounded knob 20. The front legs 5', which are tubular, are adapted to have their lower ends engaged over the knobs 20 of the base members 18, as will hereinafter more fully appear.

Angular foot or base members 21 are provided for the lower ends of the rear legs 5, each of the angular foot or base members 21 having a rounded knob 22 at its elbow or bend. The lower ends of the tubular sections 9 of the rear legs are engageable over the knobs 22 of the two base or foot members 21.

In practice, to apply the present attachment to a motor vehicle body, the base or foot members and the anchors or eye bolts are first applied to the vehicle body so as to be normally in place for the application of the legs and rear guys thereto. Thus, as illustrated in Figs. 1 and 2, the automobile body 23 embodies the front seat 24 and the rear or tonneau seat 25, the flat foot or base members 18 being bolted, or otherwise secured upon the front seat 24 adjoining the sides of the body, the angular foot or base members 21 being secured in any suitable manner within the corner between the bottom or floor 26 of the body and the back of the front seat 24 adjoining the sides of the body, and the anchors or eye bolts 15 being engaged through the rear of tonneau seat 25 adjoining the back thereof and adjoining the sides of the body. Thus, the members 18, 21 and 15 are permanently applied to the vehicle body, at convenient points thereof, without encumbering the body.

The legs, guys, and apron 1 may be compactly stowed away in any suitable compartment, when the device is not in use.

To set up the attachment, the lower ends of the front legs 5' are engaged to the knobs 20 of the base members 18, and the lower ends of the rear legs are also engaged to the knobs 22 of the base members 21, while the upper ends of the front and rear legs are engaged to the front and rear cross bars 3, as above indicated. The lower ends of the forward guys 16 are attached to the forward end of the chassis or frame of the machine, while the lower ends of the rear guys 14 are connected to the anchors or eye bolts 15. The block and tackle 17 of each forward guy 16 may then be manipulated to bring the guys and apron under tension, for holding the apron taut, under the weight of the patient or person supported thereon. In this manner, the apron may be conveniently and properly supported above the automobile body, to serve as a stretcher or bed, when desired. It is to be noted that the lower ends of the front and rear legs are disposed at the center of the body, or intermediate the ends of the body, the front legs being inclined forwardly, and the rear legs being inclined rearwardly, whereby when the forward guys 16 are tightened through the medium of the block and tackles 17, the apron 1 will be stretched in an effective and convenient manner, the strains being transmitted to the body in the most effective manner. The positions of the legs also permits the apron to vibrate or yield sufficiently, for the comfort of the patient or person lying or reclining upon the apron.

When the device is not in use, it may be readily taken down, by detaching the guys 14 and 16 from the anchors 15 and the forward end of the chassis, respectively, and by slipping the legs 5 and 5' out of engagement with the base members 21 and 18 respectively. The rear legs 5 may be telescoped together, and all of the legs may be detached from the ends of the apron, whereby the legs and guys may be rolled up within the apron to be stowed away.

Particular attention is directed to the fact that the lower ends of the legs engaging over the knobs 20, will permit the legs to properly adjust themselves to various angles, the seat members 6 of the front legs being pivoted, in order to properly accommodate themselves to the position of the apron, while the forks 12 of the rear legs engage the rear cross bar 3 to effectively hold the rear end of the apron in place.

Having thus described the invention, what is claimed as new is:—

1. In combination with an automobile body, base members permanently secured thereto and having rounded knobs, an apron, front and rear legs having their upper ends engageable with the ends of the apron and having tubular portions at their lower ends to engage over the said knobs, and front and rear guys for connecting the front and rear ends of the apron with the body.

2. In combination with an automobile body, base members secured thereto in advance and in rear of the back of the front seat, respectively, the base members having rounded knobs, an apron, front and rear legs having their upper ends engageable with the ends of the apron and having tubular portions at their lower ends to engage the said knobs, and front and rear guys for connecting the front and rear ends with the front and rear end portions of the body.

In testimony that I claim the foregoing as my own, I have hereto affixed my signature in the presence of two witnesses.

RALPH L. BRADLEY.

Witnesses:
SELINA WILLSON,
MONROE E. MILLER.